(12) United States Patent
Harada et al.

(10) Patent No.: US 12,713,178 B2
(45) Date of Patent: Aug. 18, 2026

(54) TRANSDUCER APPARATUS AND EXTERIOR EQUIPMENT

(71) Applicant: Panasonic Automotive Systems Co., Ltd., Kanagawa (JP)

(72) Inventors: Yuhei Harada, Kanagawa (JP); Tetsurou Tani, Osaka (JP); Akinori Daimo, Hyogo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 99 days.

(21) Appl. No.: 18/804,767

(22) Filed: Aug. 14, 2024

(65) Prior Publication Data

US 2025/0071476 A1 Feb. 27, 2025

(30) Foreign Application Priority Data

Aug. 21, 2023 (JP) ................................ 2023-134021

(51) Int. Cl.
*H04R 1/28* (2006.01)
*G01S 7/521* (2006.01)
*G01S 15/931* (2020.01)

(52) U.S. Cl.
CPC ............ *H04R 1/2896* (2013.01); *G01S 7/521* (2013.01); *G01S 15/931* (2013.01); *G01S 2015/938* (2013.01); *H04R 2499/13* (2013.01)

(58) Field of Classification Search
CPC ... H04R 1/2896; H04R 2499/13; G01S 7/521; G01S 15/931; G01S 2015/938
See application file for complete search history.

(56) References Cited

U.S. PATENT DOCUMENTS 6,862,935 B2 * 3/2005 Fukuda .................... G01C 9/00 73/866.5
7,613,073 B2 * 11/2009 Okuda .................... G01S 7/521 73/628
11,971,479 B2 * 4/2024 Satake .................. G01S 15/931
12,007,475 B2 * 6/2024 Okabe ................... G01S 15/931
2008/0218030 A1 9/2008 Asada et al.
2009/0223296 A1 * 9/2009 Sato ........................ G10K 9/22 73/632
2022/0057507 A1 * 2/2022 Satake .................. G01S 15/931
2024/0329224 A1 * 10/2024 Tani ........................ G01S 7/521
(Continued)

FOREIGN PATENT DOCUMENTS

CN 113785221 B * 7/2024 ............. G01S 7/521
CN 120610274 A * 9/2025 ......... G01S 7/52004
DE 112020002262 T5 * 1/2022 ............. G01S 7/521
(Continued)

OTHER PUBLICATIONS

Translation of JP2008191007 (Year: 2008).*

*Primary Examiner* — Daniel Pihulic
(74) *Attorney, Agent, or Firm* — Seed Intellectual Property Law Group LLP

(57) ABSTRACT

Provided is a transducer apparatus that includes: a main body capable of transmitting and receiving ultrasound; and an exterior attachment attached to a transmission/reception portion of the main body. The exterior attachment includes a first portion, which is disposed so as to come into contact with a leading end of the transmission/reception portion, and a second portion, which is disposed with a distance from the transmission/reception portion.

7 Claims, 7 Drawing Sheets

(56) References Cited

U.S. PATENT DOCUMENTS

| | | | | |
|---|---|---|---|---|
| 2025/0071476 | A1* | 2/2025 | Harada | G01S 15/931 |

FOREIGN PATENT DOCUMENTS

| | | | | | |
|---|---|---|---|---|---|
| JP | H04238496 | A | * | 8/1992 | |
| JP | H04238497 | A | * | 8/1992 | |
| JP | 2007147319 | A | * | 6/2007 | G01S 7/521 |
| JP | 2008191007 | A | * | 8/2008 | G10K 9/122 |
| JP | 2009058298 | A | * | 3/2009 | |
| JP | 2013522246 | A | * | 6/2013 | A61L 24/0015 |
| JP | 2025029403 | A | * | 3/2025 | G01S 15/931 |
| JP | 2025043998 | A | * | 4/2025 | H04R 1/22 |
| WO | WO 2007069609 | A1 | | 6/2007 | |

* cited by examiner

TRANSDUCER APPARATUS AND EXTERIOR EQUIPMENT

TECHNICAL FIELD

The present disclosure relates to a transducer apparatus and exterior equipment.

BACKGROUND ART

There is known a transducer apparatus capable of transmitting and receiving ultrasound in the existing technology (for example, see Patent Literature (hereinafter referred to as "PTL") 1). In such a transducer apparatus, exterior equipment is attached to a leading-end portion of the transducer apparatus. The exterior equipment is inserted into a mounting hole or the like of a mounting apparatus (for example, a vehicle) in which the transducer apparatus is mounted.

CITATION LIST

Patent Literature

PTL 1
WO 2007/069609

SUMMARY OF INVENTION

Technical Problem

Solution to Problem

A transducer apparatus according to the present disclosure includes: a main body capable of transmitting and receiving ultrasound; and an exterior attachment attached to a transmission/reception portion of the main body. The exterior attachment includes a first portion, which is disposed so as to come into contact with a leading end of the transmission/reception portion, and a second portion, which is disposed with a distance from the transmission/reception portion.

Exterior equipment according to the present disclosure is exterior equipment attachable to a transmission/reception portion of a transducer capable of transmitting and receiving ultrasound, and includes: a first portion having an inner diameter that allows the first portion to be fitted to a side wall of a leading end of the transmission/reception portion; and a second portion having an inner diameter larger than the inner diameter of the first portion.

Advantageous Effects of Invention

According to the present disclosure, it is possible to reduce the effect of reverberation vibration.

DESCRIPTION OF EMBODIMENTS

Embodiment

Hereinafter, an embodiment of the present disclosure will be described in detail with reference to the accompanying drawings.

Figure 1:
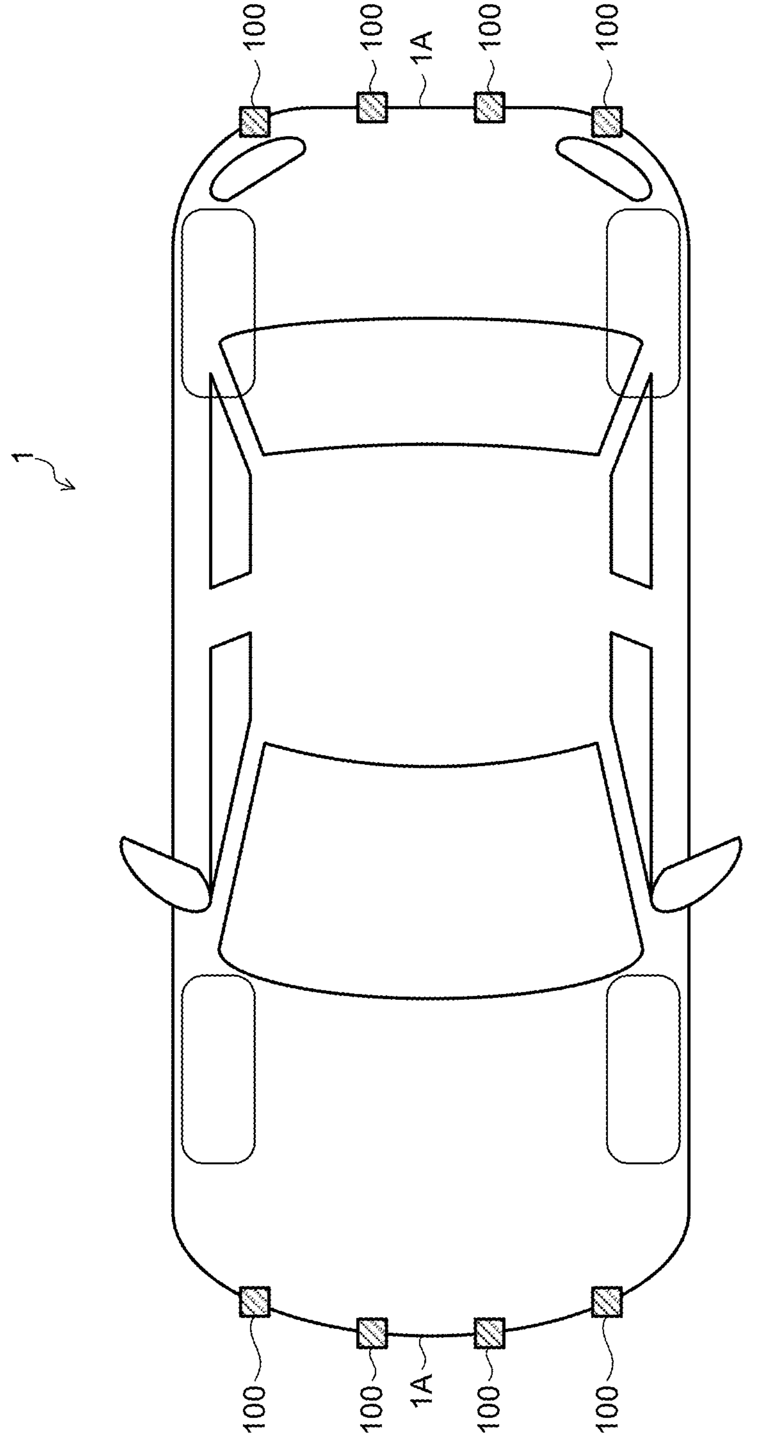
FIG. 1 illustrates a vehicle to which a transducer apparatus according to the present embodiment is applicable.

As illustrated in FIG. 1, vehicle 1 is an exemplary moving body, and includes a sonar for detecting object 2 (see FIG. 2) outside vehicle 1. Transducer apparatus 100 that is a part of the sonar is mounted in bumper portion 1A (end) of vehicle 1. The example illustrated in FIG. 1 indicates four transducer apparatuses 100 mounted in each of bumper portions 1A at the front and rear of vehicle 1.

Figure 2:
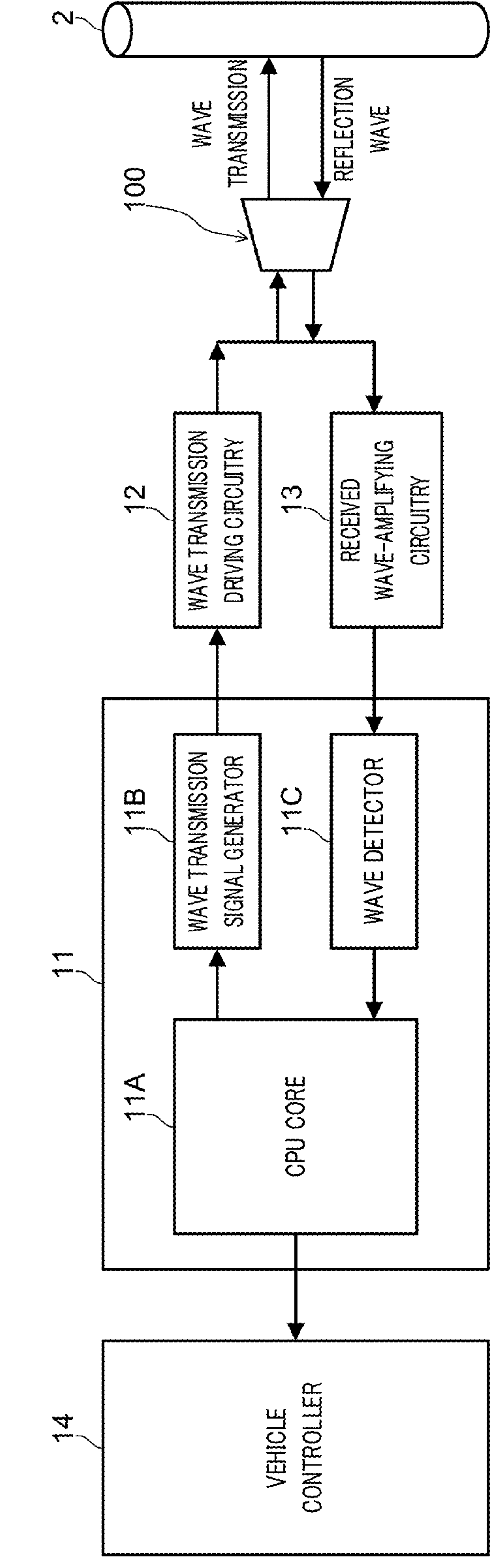
FIG. 2 is a block diagram illustrating an exemplary detection system using a sonar, to which the transducer apparatus according to the present embodiment is applicable.

As illustrated in FIG. 2, detection system 10 using the sonar includes, for example, microprocessor 11, wave transmission driving circuitry 12, received wave-amplifying circuitry 13, vehicle controller 14, and transducer apparatus 100.

Microprocessor 11 includes central processing unit (CPU) core 11A, wave transmission signal generator 11B, and wave detector 11C. CPU core 11A performs control via wave transmission signal generator 11B such that wave transmission driving circuitry 12 outputs a wave transmission signal to transducer apparatus 100.

In addition, CPU core 11A outputs a wave detection result of wave detector 11C with respect to a reflection wave signal, which is received via transducer apparatus 100 and received wave-amplifying circuitry 13, to vehicle controller 14. The reflection wave signal is, for example, a signal that is a wave transmission signal that hits and is reflected by object 2 located around vehicle 1.

Vehicle controller 14 controls the travel of vehicle 1 based on the wave detection result acquired from CPU core 11A. For example, in a case where object 2 is detected around vehicle 1 in a reflection wave signal based on a wave detection result, vehicle controller 14 controls the travel of vehicle 1 such that vehicle 1 avoids object 2.

Transducer apparatus 100 is, for example, a ultrasound transducer such as a microphone, and has functions of converting an electrical signal into ultrasound to transmit the ultrasound as well as receiving external ultrasound to convert the external ultrasound into an electrical signal. Transducer apparatus 100 is mounted at, for example, mounting hole 1B (see FIG. 5) of bumper portion 1A of vehicle 1. Mounting hole 1B is a hole that opens to outside of vehicle 1.

Transducer apparatus 100 converts an electrical signal outputted from wave transmission driving circuitry 3 into ultrasound, and transmits the ultrasound to outside of vehicle 1. In addition, transducer apparatus 100 receives ultrasound, which is transmitted from vehicle 1, hits an object outside vehicle 1, and is reflected by the object, converts the ultrasound into an electrical signal, and outputs the electrical signal to received wave-amplifying circuitry 13.

Figure 3:
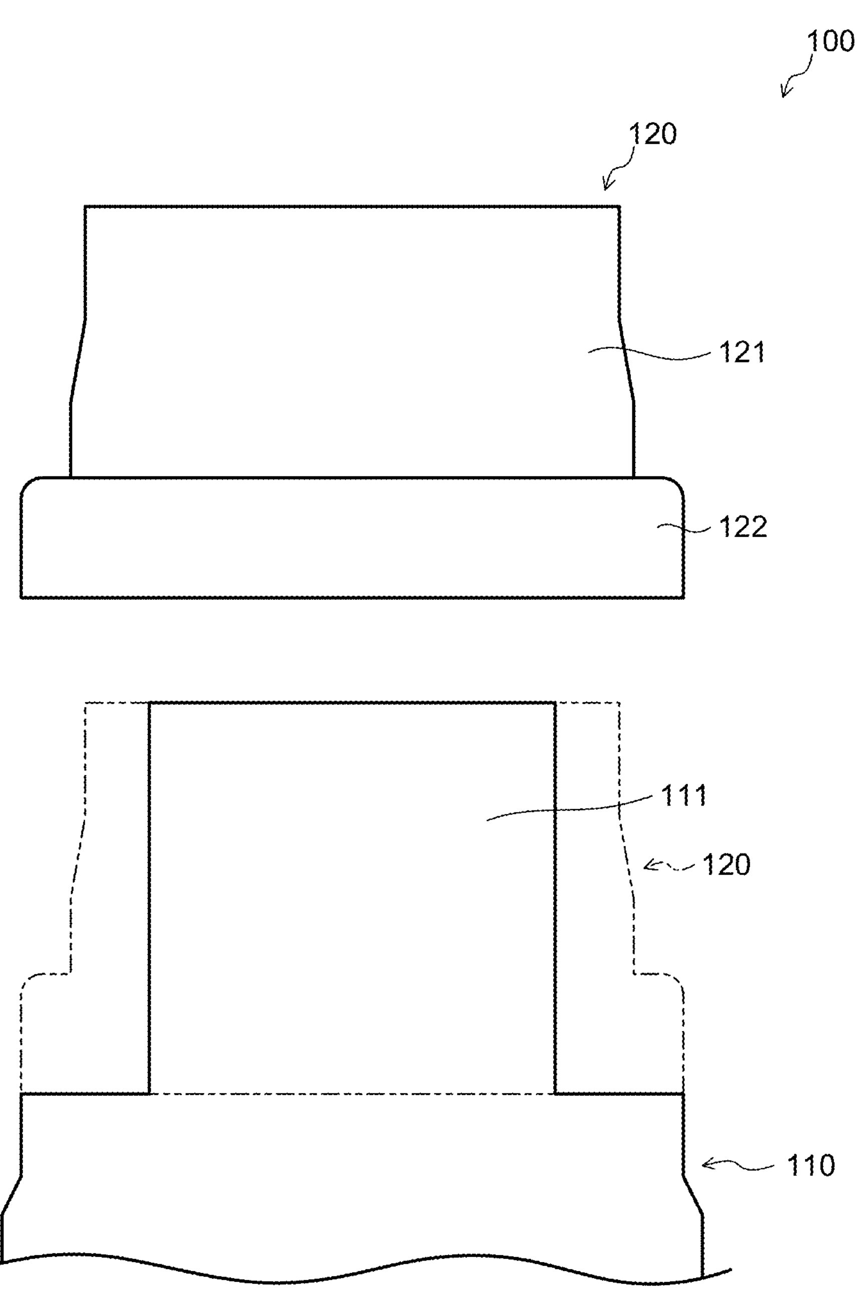
FIG. 3 is an exploded view of the transducer apparatus according to the present embodiment.

As illustrated in FIG. 3, transducer apparatus 100 includes main body 110 and exterior attachment 120.

Main body 110 is a portion forming the main body of the ultrasound transducer, and includes transmission/reception portion 111 configured in a columnar shape. Main body 110 is configured to be capable of transmitting and receiving ultrasound via transmission/reception portion 111.

Exterior attachment 120 is to be attached to transmission/reception portion 111, and comes into contact with the edge of mounting hole 1B when transducer apparatus 100 is mounted on vehicle 1. Exterior attachment 120 is formed of, for example, an elastic body such as silicone, and is attached to transmission/reception portion 111 by being fitted thereto. Exterior attachment 120 includes exterior attachment main body 121 and flange 122.

Figure 4:
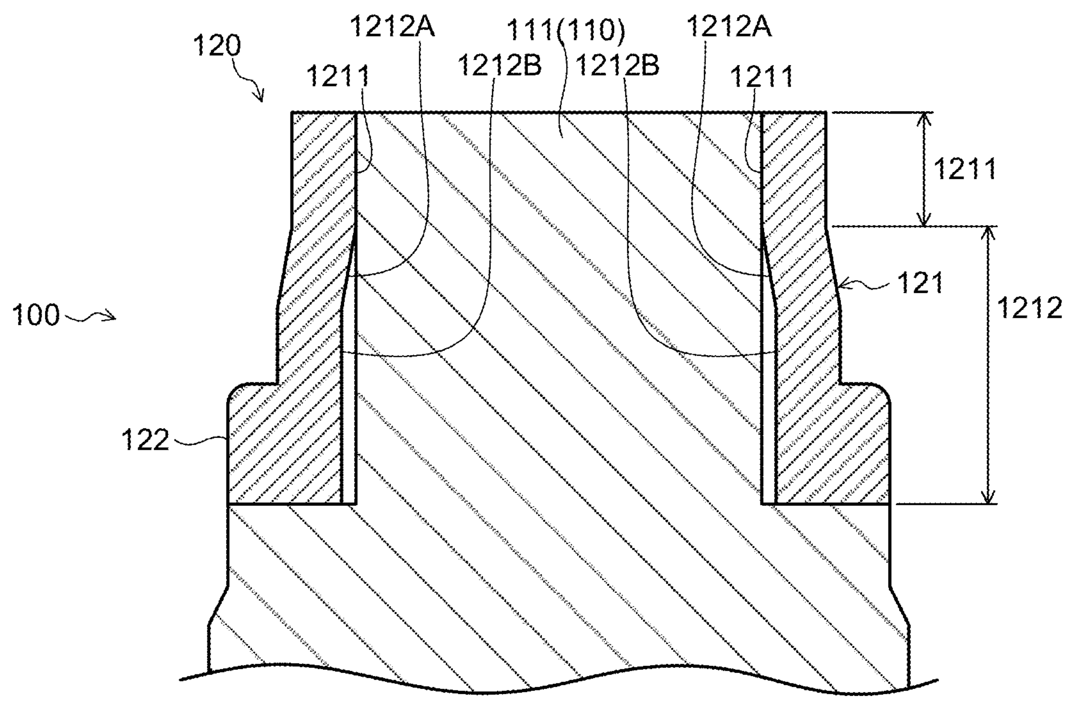
FIG. 4 is a cross-sectional view of the transducer apparatus according to the present embodiment taken along a plane including a central axis of a columnar transmission/reception portion of the transducer apparatus.

As illustrated in FIG. 4, exterior attachment main body 121 is configured in a substantially cylindrical shape, and is disposed so as to surround transmission/reception portion 111 in its entirety. Exterior attachment main body 121 includes first portion 1211 and second portion 1212.

First portion 1211 is a portion that is disposed in a position corresponding to a leading end of transmission/reception portion 111. The inner diameter of first portion 1211 has a size that allows first portion 1211 to be fitted to a side wall of transmission/reception portion 111. For example, first portion 1211 is disposed so as to come into contact with the leading end of transmission/reception portion 111.

Second portion 1212 is a portion that is disposed in a position corresponding to the portion other than the leading end of transmission/reception portion 111. Second portion 1212 is connected to first portion 1211, and has a thickness identical to the thickness of first portion 1211.

The inner diameter of second portion 1212 is larger than the inner diameter of first portion 1211, and larger than the outer diameter of transmission/reception portion 111. For example, second portion 1212 is disposed with a distance from transmission/reception portion 111. The distance between second portion 1212 and transmission/reception portion 111 can be appropriately set, but may be, for example, a distance to the extent that transmission/reception portion 111 does not come into touch with second portion 1212 when transmission/reception portion 111 vibrates. Further, the distance between second portion 1212 and transmission/reception portion 111 may be a distance to the extent that even when transmission/reception portion 111 vibrates and comes into contact with second portion 1212, the vibration is not propagated to second portion 1212.

Second portion 1212 includes inclination 1212A and non-inclination 1212B.

Inclination 1212A is disposed to be inclined from a connection portion between second portion 1212 and first portion 1211 such that the distance between second portion 1212 and transmission/reception portion 111 increases as second portion 1212 is away from first portion 1211.

Non-inclination 1212B extends from inclination 1212A, and is disposed substantially parallel to transmission/reception portion 111.

Flange 122 is a portion forming a flange of exterior attachment 120, and is disposed in a position corresponding to an end of second portion 1212 (non-inclination 1212B).

In addition, second portion 1212 is configured to be longer than first portion 1211, and may have, for example, a length approximately twice to three times the length of first portion 1211.

Figure 5:
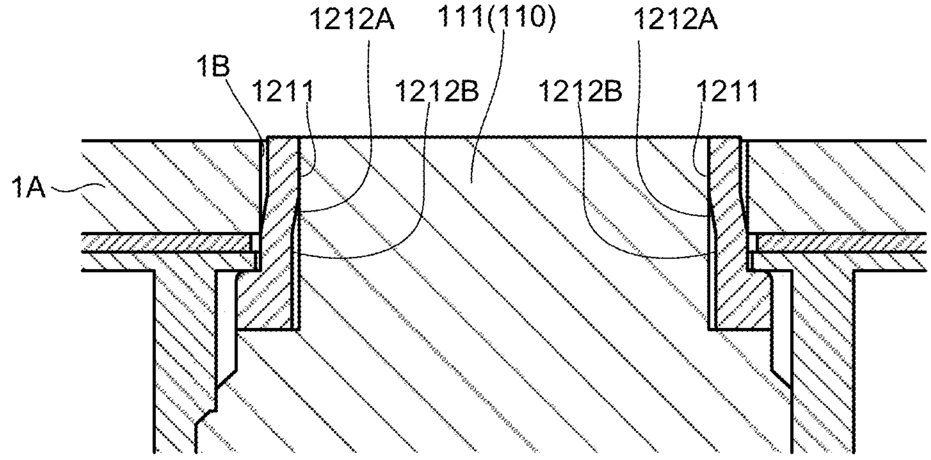
FIG. 5 is a cross-sectional view of the transducer apparatus in a state of being mounted in a bumper portion taken along a plane including the central axis of the columnar transmission/reception portion.

In addition, as illustrated in FIG. 5, the length of first portion 1211 is shorter than the length of the edge of mounting hole 1B in bumper portion 1A of vehicle 1. Then, when transducer apparatus 100 is mounted at mounting hole 1B, second portion 1212 having a larger inner diameter than first portion 1211 is disposed in contact with the edge of mounting hole 1B. For example, exterior attachment 120 is mounted such that first portion 1211 does not come into contact with the edge of mounting hole 1B and second portion 1212 comes into contact with the edge of mounting hole 1B.

The function and effect of the present embodiment configured as described above will be described. Since vibration is generated at the transmission/reception portion of the ultrasound transducer, the vibration is propagated to the bumper portion due to the exterior attachment coming into contact with the edge of the mounting hole, for example.

For example, in the case of a configuration in which the entire exterior attachment main body is the first portion (a configuration according to the existing technology), the exterior attachment comes into contact with the entire transmission/reception portion, and thus, the entire exterior attachment is subjected to the vibration at the transmission/reception portion. For this reason, when the exterior attachment in the configuration according to the existing technology is mounted so as to be fitted to the mounting hole, the vibration propagated to the entire exterior attachment is propagated directly to the bumper portion. As a result, the effect of reverberation vibration after the end of vibration may increase.

Figure 6:
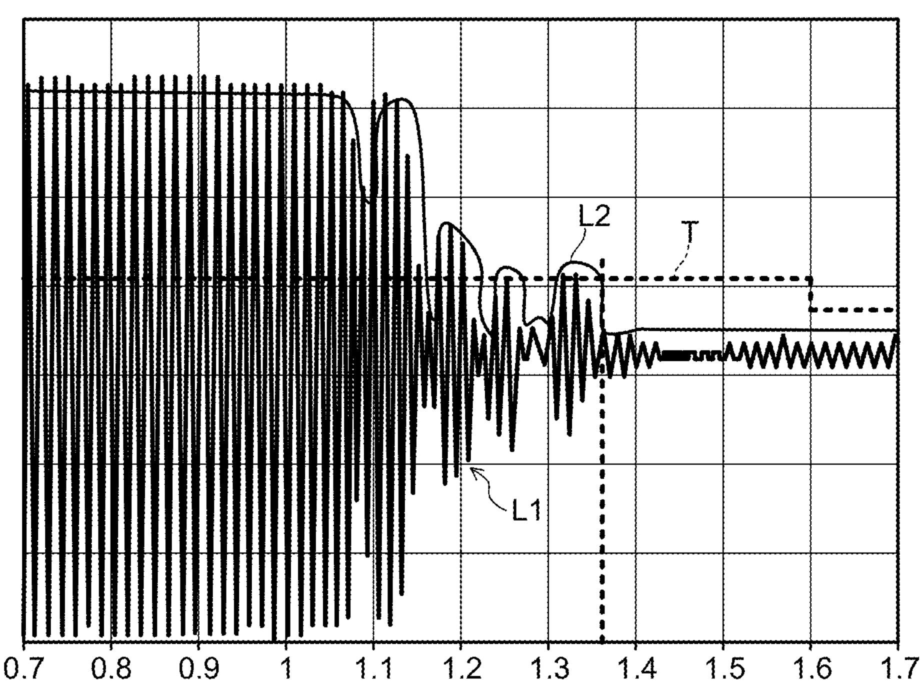
FIG. 6 illustrates a temporal characteristic of reverberation vibration after the end of vibration in a configuration according to the existing technology.

In FIG. 6, L1 indicates the input waveform at wave detector 11C, L2 indicates the output waveform at wave detector 11C, and T indicates the threshold. The horizontal axis in FIG. 6 is the time [msec], and the vertical axis in FIG. 6 indicates the strength of reverberation vibration.

The threshold is a threshold for identifying whether the signal detected by wave detector 11C is to be detected as a signal reflected by object 2, and can be set to an appropriate value. For example, in a case where the signal detected by wave detector 11C is equal to or greater than the threshold, vehicle controller 14 determines that the signal is a signal reflected by object 2, and executes travel control, which is in response to the detected object outside vehicle 1, to vehicle 1. In addition, the threshold may be set such that the value thereof after a certain time elapses after vibration ends is smaller than the value thereof before the time has elapsed.

As illustrated in FIG. 6, it has been experimentally confirmed that reverberation vibration after the end of vibration is attenuated after 1.1 msec elapse, but there is a time slot in which the reverberation vibration exceeds the threshold even after the attenuation. Accordingly, it is difficult to detect object 2 based on the detected signal.

In the present embodiment, on the other hand, vibration propagated from transmission/reception portion 111 can be reduced and the detection of object 2 can be facilitated since first portion 1211 of exterior attachment 120 comes into contact with transmission/reception portion 111 and second portion 1212 thereof does not come into contact with transmission/reception portion 111.

Figure 7:
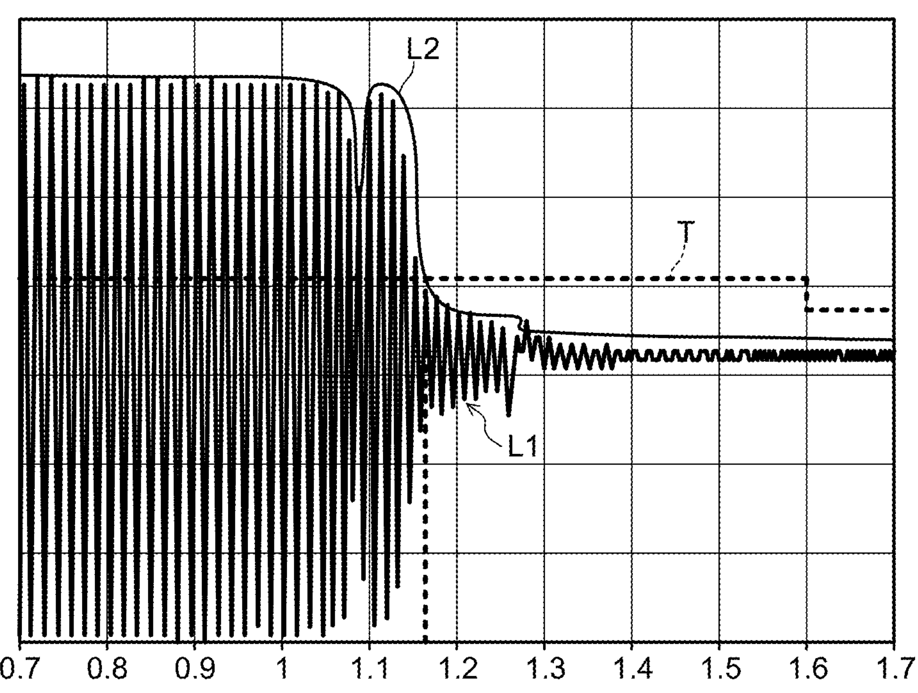
FIG. 7 illustrates a temporal characteristic of reverberation vibration after the end of vibration in the present embodiment.

In FIG. 7, L1 indicates the input waveform at wave detector 11C, L2 indicates the output waveform at wave detector 11C, and the T indicates the threshold. The horizontal axis in FIG. 7 is the time [msec], and the vertical axis in FIG. 7 indicates the strength of reverberation vibration.

As illustrated in FIG. 7, it has been experimentally confirmed that reverberation vibration after the end of vibration is attenuated after 1.1 msec elapse, and there is no time slot in which the reverberation vibration exceeds the threshold. Accordingly, it is easy to detect object 2 based on the detected signal.

Thus, the present embodiment makes it possible to reduce the effect of reverberation vibration, and the detection of object 2 can be easily performed as a result.

Figure 8:
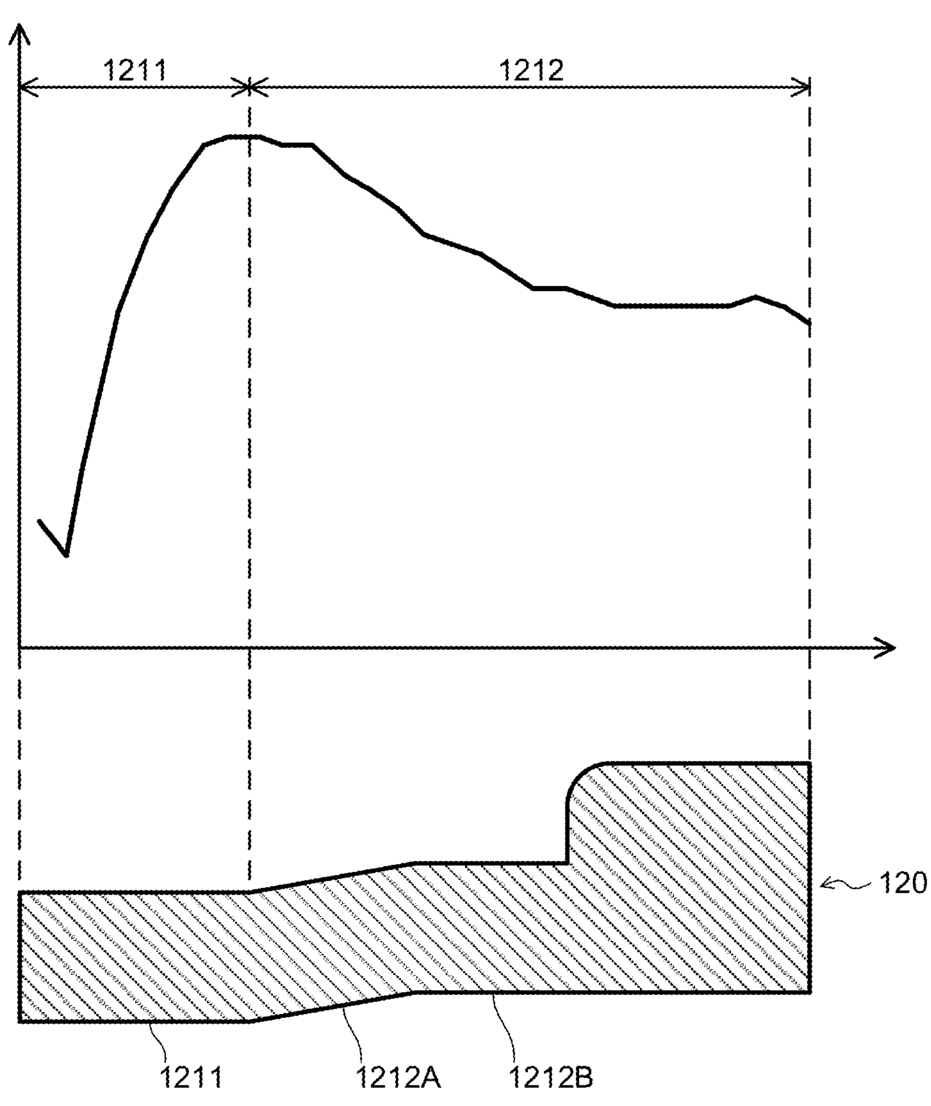
FIG. 8 illustrates characteristics of vibration intensity for each position of the transmission/reception portion.

Further, as described above, first portion 1211 is disposed in the position corresponding to the leading end of transmission/reception portion 111. As illustrated in FIG. 8, it has been experimentally confirmed that vibration intensity in a direction from a base end of transmission/reception portion 111 toward the leading end thereof is lowest in a leading-end portion thereof. The vertical axis in FIG. 8 indicates the vibration intensity. The horizontal axis in FIG. 8 indicates the position of transmission/reception portion 111. In the horizontal axis, the left end is the leading end of transmission/reception portion 111, and the right end is the base end of transmission/reception portion 111.

Specifically, it has been experimentally confirmed that the vibration intensity changes such that the vibration intensity sharply rises from the weakest value toward the base end from the leading end and slowly decreases after a peak is reached. Accordingly, the portion other than the leading end of transmission/reception portion 111 (for example, the portion corresponding to second portion 1212 of exterior attachment 120) has a relatively high vibration intensity.

In the present embodiment, first portion 1211 that comes into contact with transmission/reception portion 111 is disposed in the position corresponding to the leading end of transmission/reception portion 111, at which the vibration intensity is weak, and thus, first portion 1211 is relatively unaffected by vibration propagated from transmission/reception portion 111.

Second portion 1212 that does not come into contact with transmission/reception portion 111, on the other hand, is disposed in the position corresponding to the portion other than the leading end of transmission/reception portion 111, and thus, it is possible to prevent second portion 1212 from being affected by vibration propagated from transmission/reception portion 111, at which the vibration intensity is relatively high.

As a result, since vibration to be propagated to exterior attachment 120 can be suppressed on the whole, it is possible to reduce the effect of reverberation vibration.

In addition, as another effect, since the thickness of second portion 1212 is identical to the thickness of first portion 1211, exterior attachment 120 can be configured to have a uniform thickness as a whole. Accordingly, it is possible to configure that exterior attachment 120 can be produced easily in comparison with a configuration in which the first portion and the second portion have different thicknesses.

In addition, since second portion 1212 includes inclination 1212A that is inclined such that the distance between second portion 1212 and transmission/reception portion 111 increases as second portion 1212 is away from first portion 1211, exterior attachment 120 in its entirety can be configured to have a smooth shape. As a result, it is possible to configure that exterior attachment 120 can be produced easily.

Further, since first portion 1211 is disposed so as not to come into contact with the edge of mounting hole 1B, it is possible to separate first portion 1211, to which vibration is transmitted from transmission/reception portion 111, from bumper portion 1A of vehicle 1. Accordingly, it is possible to suppress direct propagation of vibration from transmission/reception portion 111 to bumper portion 1A although the vibration is relatively small.

In addition, since second portion 1212 is disposed so as to come into contact with the edge of mounting hole 1B, vibration propagated to first portion 1211 passes through second portion 1212 before the vibration is propagated to bumper portion 1A. Accordingly, since the propagation length of vibration can be configured to be relatively long, it is possible to attenuate vibration to be propagated to bumper portion 1A, and further it is possible to further reduce the effect of reverberation vibration.

In addition, since exterior attachment 120 is formed of silicone, it is possible to suppress a temperature-based change in the elastic force in exterior attachment 120. In addition, since silicone is excellent in elasticity, it is possible to smoothly attach exterior attachment 120 to bumper portion 1A with a good appearance. As a result, it is possible to improve the design of vehicle 1.

In addition, since exterior attachment 120 is disposed with first portion 1211 coming into contact with transmission/reception portion 111 and second portion 1212 with a distance from transmission/reception portion 111, the gap between exterior attachment 120 and transmission/reception portion 111 is a location at which second portion 1212 and transmission/reception portion 111 face each other.

For example, when the gap between the exterior attachment and the transmission/reception portion is partitioned with partitions or the like so as to be a plurality of spaces, water may be hardly escaped due to the partitions when a liquid intrudes from outside. In the present embodiment, on the other hand, when a liquid intrudes from outside, it is possible to easily escape the liquid through the gap at the location at which second portion 1212 and transmission/reception portion 111 face each other, for example, a gap at one location.

Note that, in the embodiment described above, there is a distance between the second portion of the exterior attachment and the transmission/reception portion by configuring such that the second portion is away from the transmission/reception portion, but the present disclosure is not limited thereto. For example, there may be a distance between the second portion and the transmission/reception portion by configuring such that the transmission/reception portion is partially recessed with respect to the exterior attachment.

In addition, in the embodiment described above, the second portion includes the inclination, but the present disclosure is not limited thereto. For example, there may be a distance between the second portion and the transmission/reception portion by configuring the first portion and the second portion in a stepped shape.

Further, in the embodiment described above, the thickness of the second portion is identical to the thickness of the first portion, but the present disclosure is not limited thereto, and the thickness of the second portion may be different from the thickness of the first portion. For example, an inner wall surface portion of the exterior attachment main body may be configured such that the portion corresponding to the second portion is thinner than the portion corresponding to the first portion.

In addition, in the embodiment described above, the exterior attachment is formed of silicone, but the present disclosure is not limited thereto, and the exterior attachment may be formed of an elastic material other than silicone.

In addition, in the embodiment described above, the first portion is not in contact with the bumper portion, but the present disclosure is not limited thereto, and the first portion may be in contact with the bumper portion.

In addition, in the embodiment described above, the transducer apparatus is mounted on the vehicle, but the present disclosure is not limited thereto, and the transducer apparatus may be mounted in a moving body other than the vehicle.

In addition, any of the embodiment described above is only illustration of an exemplary embodiment for implementing the present disclosure, and the technical scope of the present disclosure shall not be construed limitedly thereby. For this reason, the present disclosure can be implemented in various forms without departing from the gist or the main features thereof.

While various embodiments have been described herein above, it is to be appreciated that various changes in form and detail may be made without departing from the spirit and scope of the present disclosure(s) or hereafter claimed.

This application is entitled to and claims the benefit of Japanese Patent Application No. 2023-134021, filed on Aug. 21, 2023, the disclosure of which including the specification, drawings and abstract is incorporated herein by reference in its entirety.

INDUSTRIAL APPLICABILITY

The transducer apparatus in the present disclosure is useful as a transducer apparatus and exterior equipment each of which is capable of reducing reverberation vibration.

The invention claimed is:

1. A transducer apparatus, comprising:

a main body including a transmission and reception portion, which, in operation, transmits and receives ultrasound; and an exterior attachment attached to a sidewall of the transmission and reception portion, wherein the exterior attachment includes a first portion and a second portion, the first portion being disposed in contact with the sidewall of the transmission and reception portion at a leading end of the transmission and reception portion, the second portion being disposed laterally to and with a distance from the sidewall of the transmission and reception portion.

2. A transducer apparatus, comprising:

a main body, which, in operation, transmits and receives ultrasound; and an exterior attachment attached to a transmission and reception portion of the main body, wherein the exterior attachment includes a first portion and a second portion, the first portion being disposed in contact with a leading end of the transmission and reception portion, the second portion being disposed with a distance from the transmission and reception portion, and a thickness of the second portion is identical to a thickness of the first portion.

3. The transducer apparatus according to claim 2, wherein the second portion includes an inclination that is inclined such that the distance between the second portion and the transmission and reception portion increases as the second portion is away from the first portion.

4. The transducer apparatus according to claim 1, which is mounted at a mounting hole at an end of a moving body, the mounting hole opening to outside of the moving body.

5. A transducer apparatus, comprising:

a main body, which, in operation, transmits and receives ultrasound; and an exterior attachment attached to a transmission and reception portion of the main body, wherein the exterior attachment includes a first portion and a second portion, the first portion being disposed in contact with a leading end of the transmission and reception portion, the second portion being disposed with a distance from the transmission and reception portion, and the transducer apparatus is configured to be mounted at a mounting hole at an end of a moving body, the mounting hole opening to outside of the moving body, the exterior attachment is disposed such that the first portion is not in contact with an edge of the mounting hole and the second portion is in contact with the edge of the mounting hole.

6. A transducer apparatus, comprising:

a main body, which, in operation, transmits and receives ultrasound; and an exterior attachment attached to a transmission and reception portion of the main body, wherein the exterior attachment includes a first portion and a second portion, the first portion being disposed in contact with a leading end of the transmission and reception portion, the second portion being disposed with a distance from the transmission and reception portion, and the first portion and the second portion are formed of silicone.

7. Exterior equipment attached to a transmission and reception portion of a transducer, the transducer, which, in operation, transmits and receives ultrasound, the exterior equipment comprising:

a first portion having an inner diameter that allows the first portion to contact a side wall of the transmission and reception portion at a leading end of the transmission and reception portion; and a second portion having an inner diameter larger than the inner diameter of the first portion that allows the second portion to be spaced laterally from the side wall of the transmission and reception portion.

* * * * *